(12) United States Patent
Belsom (10) Patent No.: US 10,502,140 B2
(45) Date of Patent: *Dec. 10, 2019

(54) SYSTEM FOR SEALING BETWEEN COMBUSTORS AND TURBINE OF GAS TURBINE ENGINE

(71) Applicant: General Electric Company, Schenectady, NY (US)

(72) Inventor: Keith Cletus Belsom, Laurens, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 405 days.

This patent is subject to a terminal disclaimer.

(21) Appl. No.: 15/371,138

(22) Filed: Dec. 6, 2016

(65) Prior Publication Data

US 2017/0082030 A1 Mar. 23, 2017

Related U.S. Application Data

(63) Continuation of application No. 14/145,774, filed on Dec. 31, 2013, now Pat. No. 9,528,383.

(51) Int. Cl.
| | |
|---|---|
| *F02C 7/28* | (2006.01) |
| *F23R 3/60* | (2006.01) |
| *F01D 9/04* | (2006.01) |
| *F01D 11/00* | (2006.01) |
| *F01D 9/02* | (2006.01) |
| *F02C 3/14* | (2006.01) |
| *F23R 3/46* | (2006.01) |

(52) U.S. Cl.
CPC ............ *F02C 7/28* (2013.01); *F01D 9/023* (2013.01); *F01D 9/041* (2013.01); *F01D 11/003* (2013.01); *F02C 3/14* (2013.01); *F23R 3/46* (2013.01); *F23R 3/60* (2013.01); *F05D 2220/3212* (2013.01); *F05D 2240/55* (2013.01); *F23R 2900/00012* (2013.01)

(58) Field of Classification Search
CPC ........ F01D 9/023; F01D 9/041; F01D 11/003; F05D 2220/3212; F05D 2240/55; F23R 3/60; F23R 2900/00012
USPC ................... 60/796–800; 415/135, 137, 138
See application file for complete search history.

(56) References Cited

U.S. PATENT DOCUMENTS

| | | |
|---|---|---|
| 3,965,066 A | 6/1976 | Sterman et al. |
| 5,785,492 A | 7/1998 | Belsom et al. |
| 6,347,508 B1 | 2/2002 | Smallwood et al. |
| 6,652,229 B2 | 11/2003 | Lu |
| 6,792,763 B2 | 9/2004 | Sileo et al. |
| 6,860,108 B2 | 3/2005 | Soechting et al. |
| 7,178,340 B2 | 2/2007 | Jorgensen |
| 7,246,995 B2 | 7/2007 | Zborovsky |
| 7,784,264 B2 | 8/2010 | Weaver et al. |
| 8,142,142 B2 | 3/2012 | Zborovsky et al. |

(Continued)

*Primary Examiner* — Steven M Sutherland
(74) *Attorney, Agent, or Firm* — Fletcher Yoder, P.C.

(57) ABSTRACT

A gas turbine engine includes a gas turbine and a plurality of combustors each in fluid communication with the gas turbine. The gas turbine engine includes a first seal disposed between the gas turbine and the plurality of turbine combustors. The first seal is configured to sealingly engage with the gas turbine and at least two of the plurality of turbine combustors. The gas turbine engine also includes a second seal disposed between the gas turbine and the plurality of turbine combustors. The second seal is configured to sealingly engage with the gas turbine and at least two of the plurality of turbine combustors.

10 Claims, 8 Drawing Sheets

(56) References Cited

U.S. PATENT DOCUMENTS

2007/0237630 A1    10/2007    Schiavo, Jr. et al.
2010/0054928 A1    3/2010    Schiavo
2012/0085103 A1    4/2012    Lacy et al.
2012/0200046 A1    8/2012    Green et al.

SYSTEM FOR SEALING BETWEEN COMBUSTORS AND TURBINE OF GAS TURBINE ENGINE

CROSS-REFERENCE TO RELATED APPLICATIONS

This application is a continuation of U.S. patent application Ser. No. 14/145,774, entitled "SYSTEM FOR SEALING BETWEEN COMBUSTORS AND TURBINE OF GAS TURBINE ENGINE," filed Dec. 31, 2013, which is herein incorporated by reference in its entirety for all purposes.

BACKGROUND

The subject matter disclosed herein relates generally to seals for gas turbines. More particularly, the disclosed subject matter relates to a seal assembly between a plurality of combustors and a turbine nozzle.

Gas turbine engines typically include a compressor, a plurality of combustors, and a gas turbine. For example, the plurality of combustors may be configured in an annular arrangement around a central axis of the gas turbine engine, such that each combustor directs combustion products through its respective transition piece into the gas turbine. Seals may be disposed between the plurality of combustors and the gas turbine to seal the flow path of combustion products and reduce leakage of combustion products. Each transition piece of each combustor may be sealed to the gas turbine separately. In other words, a separate seal may be used to seal the flow path between each combustor and the gas turbine.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

A gas turbine engine includes a gas turbine and a plurality of combustors each in fluid communication with the gas turbine. The gas turbine engine includes a first seal disposed between the gas turbine and the plurality of turbine combustors. The first seal is configured to sealingly engage with the gas turbine and at least two of the plurality of turbine combustors. The gas turbine engine also includes a second seal disposed between the gas turbine and the plurality of turbine combustors. The second seal is configured to sealingly engage with the gas turbine and at least two of the plurality of turbine combustors.

In a second embodiment, a system includes a gas turbine and a plurality of turbine combustors. Each of the plurality of turbine combustors is in fluid communication with the gas turbine. Further, the system includes a seal disposed between the gas turbine and the plurality of turbine combustors. The seal is configured to sealingly engage the gas turbine to at least two of the plurality of combustors.

In a third embodiment, a system includes a gas turbine engine that includes a gas turbine and a plurality of combustors disposed in an annular arrangement, such that each of the plurality of combustors is in fluid communication with the gas turbine. A radially outward arcuate seal is disposed between the gas turbine and the plurality of turbine combustors. The radially outward arcuate seal is configured to be mounted to the gas turbine and to sealingly engage with the gas turbine and respective transition pieces of at least two of the plurality of combustors. Further, the gas turbine engine includes a radially inward arcuate seal disposed between the gas turbine and the plurality of turbine combustors. The radially inward arcuate seal is configured to be mounted to the gas turbine and to sealingly engage with the gas turbine and the respective transition pieces of the at least two of the plurality of turbine combustors

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Embodiments of the present disclosure are directed toward a seal assembly for sealingly engaging with a plurality of gas turbine transition pieces (e.g., downstream portions of turbine combustors) and a nozzle of a turbine. For example, the disclosed embodiments include a seal assembly that may include a radially outer arcuate seal and a radially inner arcuate seal that each sealingly engages with multiple transition pieces and the nozzle of the turbine, along with a side seal disposed circumferentially between two transition pieces. By sealingly engaging multiple transition pieces with the seal assembly (e.g., the radially outer arcuate seal and radially inner arcuate seal each engage multiple transition pieces), leakage of fluid between the plurality of combustors and the nozzle of the turbine may be reduced relative to systems having separate seals for each transition piece. Additionally, the seal assembly discussed above may reduce the number of seal assembly components, thereby reducing costs associated with constructing the seal assembly.

Figure 1:
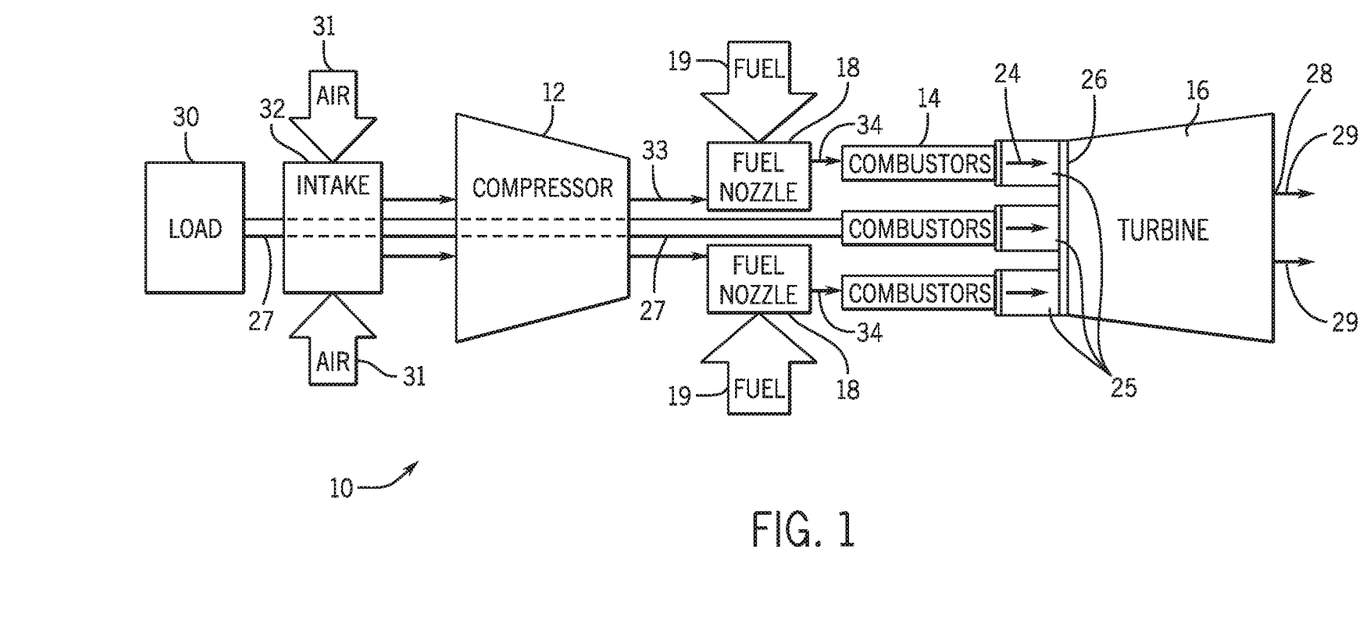
FIG. 1 is a block diagram of a gas turbine engine, in accordance with an embodiment of the present disclosure.

Turning now to the drawings, FIG. 1 illustrates a block diagram of an embodiment of a gas turbine system 10. The diagram includes a compressor 12, turbine combustors 14, and a turbine 16. The turbine combustors 14 include fuel nozzles 18 which route a liquid fuel and/or gas fuel 19, such as natural gas or syngas, into the turbine combustors 14.

The turbine combustors 14 ignite and combust an air-fuel mixture, and then pass hot pressurized combustion gases 24 (e.g., combustion products) through transition pieces 25 into the turbine 16. The transition pieces 25 may be sealed to a portion of the turbine 16 via one or more seal assemblies 26. As discussed below, the seal assemblies 26 may be shared across multiple transition pieces 25 to provide improved sealing. Turbine blades are coupled to a shaft 27, which is also coupled to several other components throughout the turbine system 10. As the combustion gases 24 pass through the turbine blades in the turbine 16, the turbine 16 is driven into rotation, which causes the shaft 27 to rotate. In other words, the turbine blades extract work from the combustion gases. Eventually, the combustion gases 24 exit the turbine system 10 via an exhaust outlet 28 as exhaust gas 29. Further, the shaft 27 may be coupled to a load 30, which is powered via rotation of the shaft 27. For example, the load 30 may be any suitable device that may generate power via the rotational output of the turbine system 10, such as a power generation plant or an external mechanical load. For instance, the load 30 may include an electrical generator, a propeller of an airplane, and so forth.

In an embodiment of the gas turbine system 10, compressor blades are included as components of the compressor 12. The blades within the compressor 12 are coupled to the shaft 27, and will rotate as the shaft 27 is driven to rotate by the turbine 16, as described above. The rotation of the blades within the compressor 12 causes compression of air 31 from an air intake 32, thereby generating compressed air 33. The compressed air 33 is then fed into the fuel nozzles 18 of the combustors 14. The fuel nozzles 18 mix the compressed air 33 and fuel 19 to produce a mixture 34 with a suitable mixture ratio for combustion (e.g., a combustion that causes the fuel to more completely burn) so as not to waste fuel or cause excess emissions.

Figure 2:
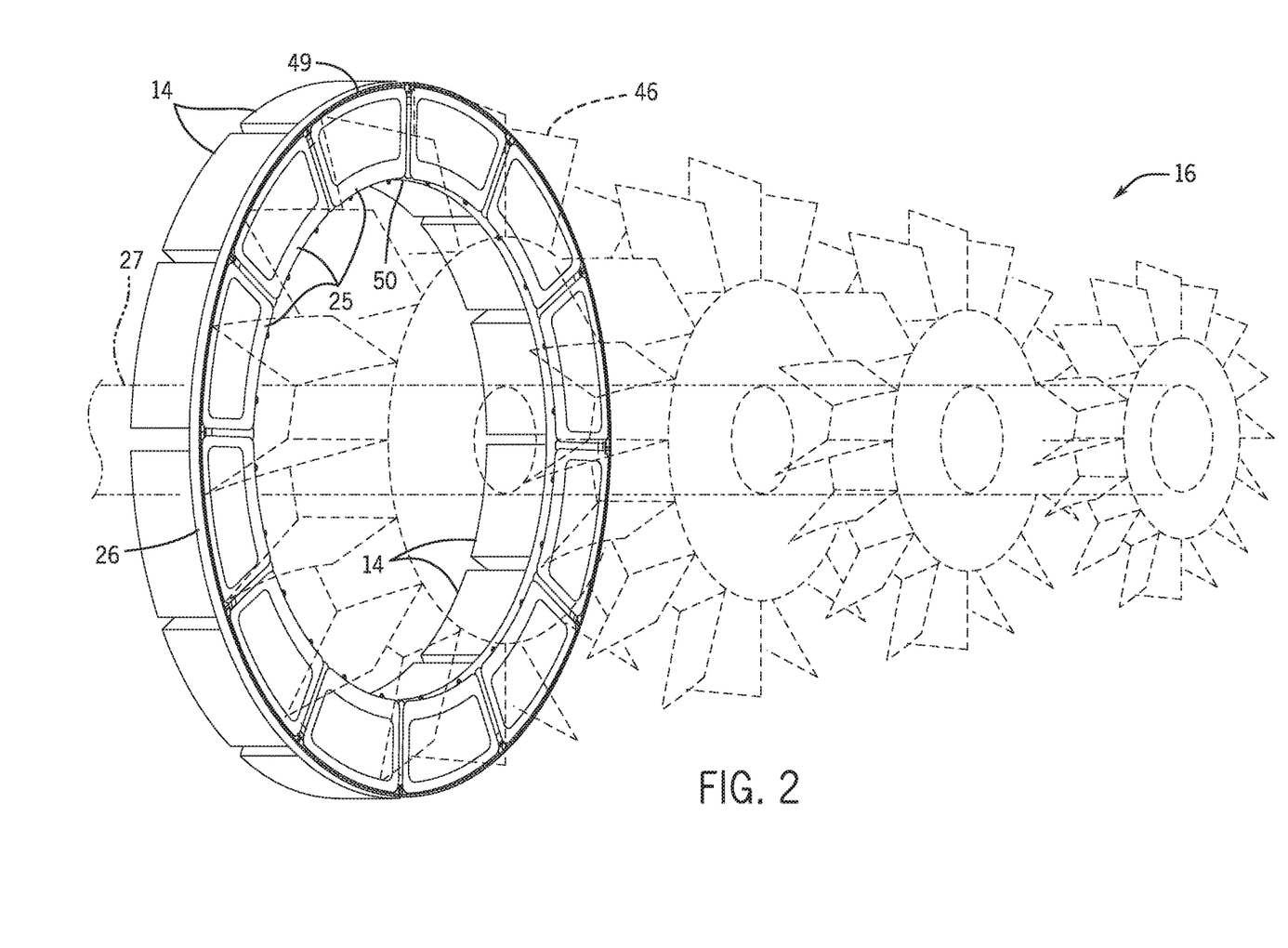
FIG. 2 is a perspective view of a plurality of combustors with transition pieces sealed to a turbine, in accordance with an embodiment of the present disclosure.

FIG. 2 illustrates an embodiment of the plurality of combustors 14 and the turbine 16. Specifically, the combustors 14 are configured in an annular arrangement and have the transition pieces 25 disposed between each respective combustor 14 and the turbine 16, such that the transition pieces 25 are sealed to the turbine 16. It should be noted that each transition piece 25 may or may not be considered a part of its respective combustor 14. Thus, any reference to geometry and/or engagements associated with one or more of the transition pieces 25 may be construed, in another embodiment, to be an actual part (e.g., a downstream combustor portion) of the respective combustor(s) 14. The transition pieces 25 illustrated in the present embodiment may be configured to receive and direct combustion products exiting the combustors 14 toward a nozzle 46 (e.g., a stage one nozzle) of the turbine 16. As mentioned above, the turbine 16 extracts work from the combustion products (e.g., combustion gases 24) by directing the combustion products across and between turbine blades of the turbine 16, thereby forcing rotation of the shaft 27. The shaft provides power (e.g., rotational power) to the compressor 12 and the load 30, as previously discussed. The seal assemblies 26 between the transition pieces 25 and the turbine 16 block combustion products from escaping the gas turbine system 10. The seal assemblies 26 are generally disposed between the transition pieces 25 and the turbine 16 (e.g., the nozzle 46 of the turbine 16) in an annular arrangement. Further, as discussed below, the seal assemblies 26 of the present embodiment may sealingly engage with at least a portion of two or more (e.g., 2, 3, 4, 5, 6, or more) transition pieces 25. For example, a radially outer seal of the seal assembly 26 may create a sealing interface between two or more (e.g., 2, 3, 4, 5, 6, or more) transition pieces 25 and an outer diameter 49 of the nozzle 46 of the turbine 16. Likewise, a radially inner seal of the seal assembly 26 may create a sealing interface between two or more (e.g., 2, 3, 4, 5, 6, or more) transition pieces 25 and an inner diameter 50 of the nozzle 46 of the turbine 16. The radially outer and radially inner seals, for example, may be finger seals. The disclosed seal assemblies 26 (e.g., shared among multiple transition pieces 25) may have an improved effectiveness (e.g., may enable improved reduction in leakage of combustion products), and therefore may improve the efficiency of the gas turbine system 10.

Figure 3:
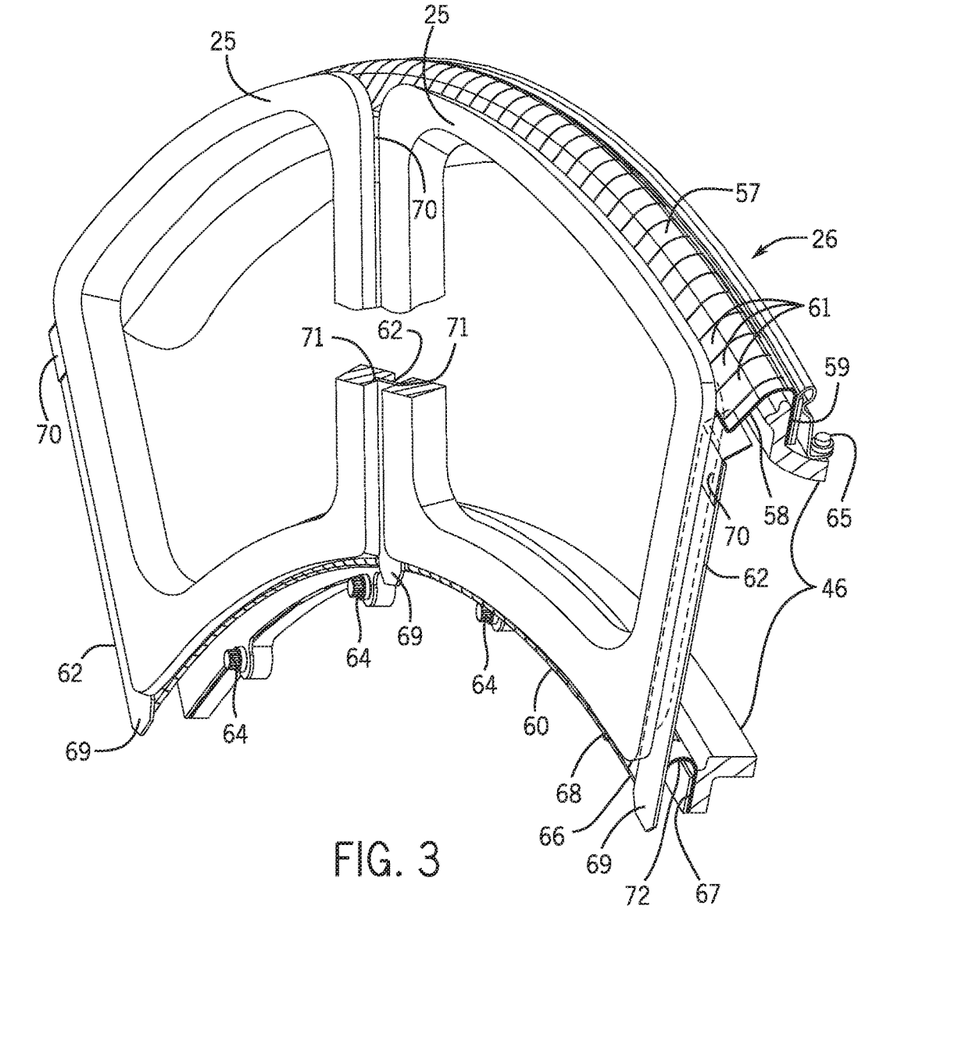
FIG. 3 is a perspective view of an embodiment of a seal assembly for two transition pieces and a nozzle (e.g., a stage 1 nozzle) of the turbine of FIG. 2.
Figure 4:
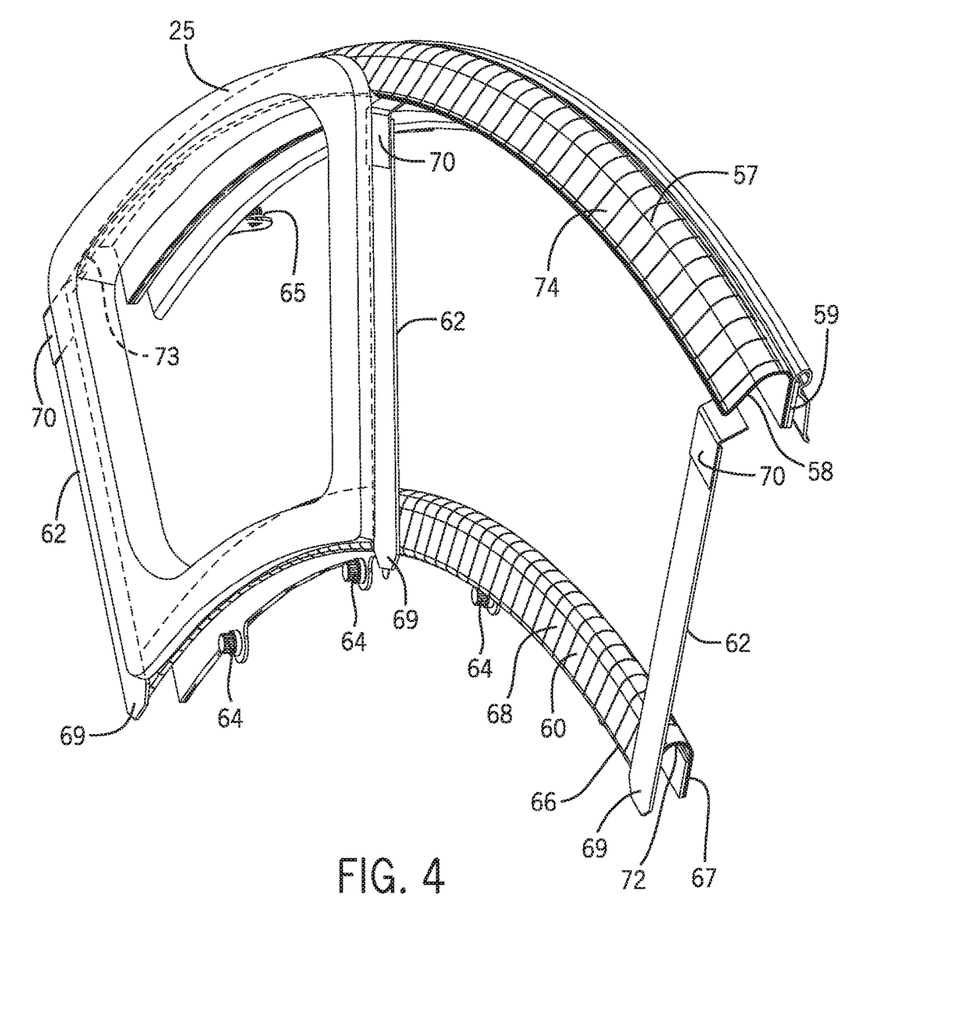
FIG. 4 is a perspective view of an embodiment of the seal assembly of FIG. 3 with one transition piece.

Perspective views of an embodiment of the seal assembly 26 are illustrated in FIGS. 3 and 4. Specifically, FIG. 3 shows the seal assembly 26 disposed between multiple transition pieces 25 and a portion of the nozzle 46 (e.g., stage one nozzle) of the turbine 16. For clarity, FIG. 4 illustrates the seal assembly 26 of FIG. 3 without the turbine 16 and with only one transition piece 25, such that the seal assembly 26 is clearly shown. In these illustrated embodiments, the seal assembly 26 comprises a radially outer arcuate seal 57 (herein referred to as "outer seal 57") including an angled leg 58 and a vertical leg 59, a radially inner arcuate seal 60 (herein referred to as "inner seal 60"), and a plurality of side seals 62. As previously described, the outer seal 57 and/or the inner seal 60 may be finger seals. For example, the outer seal 57 and the inner seal 60 may each be made up of multiple fingers 61 that are configured to be able to flex independently of one another. The multiple fingers 61 may enable the outer seal 57 and/or inner seal 60 to curve circumferentially along two or more transition pieces 25, as described in detail below, as well as accommodate axial and radial movement of the nozzle 46 to the transition pieces 25. In another embodiment, the outer seal 57 and the inner seal 60 may be continuous. In other words, the outer seal 57 and the inner seal 60 may each extend circumferentially about two or more transition pieces 25, each as a single, continuous component (e.g., with no fingers 61).

Focusing on FIG. 3, the inner seal 60 and outer seal 57 include multiple fingers 61. For example, in certain embodiments, the angled leg 58 of the outer seal 57 includes multiple fingers 61 and the vertical leg 59 is continuous. The fingers 61 of the angled leg 58 may enable the outer seal 57 to curve annularly over the transition pieces 25. The fingers 61 may also enhance the seal of the outer seal 57. A similar arrangement may be included for the inner seal 60. In another embodiment, the inner seal 60 and outer seal 57 may be continuous as they extend circumferentially over the transition pieces 25 (e.g., without fingers 61). In either configuration, the inner seal 60 is secured to the nozzle 46 of the turbine 16 via inner bolts 64, such that the inner seal 60 is sealingly engaged with the nozzle 46. Similarly, the outer seal 57 is bolted to the nozzle 46 of the turbine 16 via outer bolts 65, such that the outer seal 57 is sealingly engaged with the nozzle 46. It should be noted that the illustrated direction of the inner bolts 64 and the outer bolts 65, and the orientation of the accompanying surfaces being bolted together, are merely meant as representations of one embodiment of the present disclosure. For example, in another embodiment, the outer seal 57 may wrap around the nozzle 46 and radially inward, and the outer bolts 65 may mount the outer seal 57 to the nozzle 46 by pointing toward the transition pieces 25 (e.g., oriented in the same direction as inner bolts 64 in the illustrated embodiment). The presently illustrated inner and outer bolts 64, 65 are intended to illustrate an embodiment of how the inner and outer seals 60, 57 may be mounted to the nozzle 46 of the turbine 16. It should be appreciated that any variation of the presently illustrated bolts 64, 65 used to mount the transition pieces 25 and the nozzle 46 would not be considered as materially departing from the present disclosure to one of ordinary skill in the art. Additionally, the inner seal 60 and/or the outer seal 57 may be secured to the nozzle 46 of the turbine 16 in some other manner. For example, the inner seal 60 and/or the outer seal 57 may be secured to the nozzle 46 by welding or brazing, by coupling each respective seal 57, 60 to the nozzle 46 via clips, or by utilizing a pressure drop across the seal assembly generated by combustion products flowing from the combustors 14 to the nozzle 46. In other words, the pressure drop may press elements of the seal assembly 26 (e.g., the outer seal 57, the inner seal 60, and/or the side seal 62) into a sealing engagement with the transition piece(s) 25 and the nozzle 46, as described in detail below, which may assist in securing the elements of the seal assembly 26 to the nozzle 46.

The inner seal 60 is disposed downstream the transition pieces 25 and upstream the nozzle 46 with respect to flow of the combustion products from the combustors 14. The inner seal 60 may be a U-shaped profile, where the U-shaped profile extends along a curved path over two or more transition pieces 25. The U-shaped profile of the inner seal 60 includes a first leg 66 and a second leg 67. The first leg 66 in the illustrated embodiment includes an outer surface 68. The outer surface 68 of the first leg 66 contacts the inside of multiple transition pieces 25, as illustrated in the present embodiment. Further, the outer surface 68 of the first leg 66 of the inner seal 60 may contact the inside of a bottom portion 69 of one or more of the side seals 62, and the bottom portion 69 of each side seal 62 is disposed opposite a shimmed portion 70 (e.g., top portion) of each side seal 62, and the side seal 62 is disposed in slots 71 of the transition pieces 25, as described below.

The inner seal 60 with the U-shaped profile may include the second leg 67 configured in a sealing engagement with a portion of the nozzle 46, which will be described in detail below with reference to later figures. The inner seal 60 with the first leg 66 and the second leg 67 may be configured to be in compression during rest (e.g., between the transition pieces 25 and the nozzle 46), such that a base portion 72 of the inner seal 60 experiences a compressive force. In other words, the inner seal 60 includes a U-shaped profile made up of the first leg 66, the second leg 67, and the base portion 72, and the base portion 72 experiences a compressive force while the first leg 66 and second leg 67 are forced inwardly toward each other. As such, the inner seal 60 remains in a sealing engagement with the transition pieces 25 and the nozzle 46 when combustion products and/or thermal expansion forces the nozzle 46 away from the transition pieces 25 (e.g., a portion of the compressive force within the base portion 72 of the U-shaped inner seal 60 is released such that the first leg 66 and the second leg 67 of the inner seal 60 flex outwardly and maintain a sealing contact with the transition pieces 25 and the nozzle 46 of the turbine 16, as described above). Additionally, the transition pieces 25 of the present embodiment may include slots 71 configured to receive the side seals 62 of the seal assembly 26. In other words, the side seals 62 may fit between two adjacent transition pieces 25 and into the slots 71 of the two transition pieces 25. The side seals 62 may be pressed against the slots 71 when combustion products pass through the transition pieces 25, such that the side seals 62 seal the area between the transition pieces 25. Further, a portion of the outer seal 57 (e.g., the angled leg 58) may fit into a portion of the transition pieces 25 to seal the transition pieces 25 to the outer diameter 49 of the turbine 16. The engagement of the outer seal 57 with the transition pieces 25 is discussed in detail below with reference to FIG. 4.

Focusing on FIG. 4, the outer seal 57 includes the angled leg 58 and the vertical leg 59. The angled leg 58 and the vertical leg 59 may make up a U-shaped profile, similar to the U-shaped profile of the inner seal 60, where the U-shaped profile of the outer seal 57 extends annularly over two or more transition pieces 25. In the illustrated embodiment, the U-shaped profile of the outer seal 57 includes the angled leg 58 and the vertical leg 59. In another embodiment, the vertical leg 59 may not be vertical. In other words, the vertical leg 59 may be vertical or angled, and generally conforms to the angle used to seal the vertical leg 59 to a surface of the nozzle 46, as described in detail below.

Continuing with the illustrated embodiment, each side seal 62 of the present embodiment has a bottom portion 69 disposed over the outer surface 68 of the inner seal 60, such that the inner seal 60 is in contact with transition piece 25, as previously described, as well as the bottom portion 69 of the side seals 62. In the present embodiment, the side seals 62 also include the radially outer shimmed portions 70 disposed under a bottom surface 73 of an angled leg 58 of the outer seal 57. Further, the shimmed portion 70 of the side seal 62 may be disposed into a grooved portion 76 of each of the two transition pieces 25 (later described with reference to FIG. 6). The grooved portion 76 is angled underneath the shimmed portion 70 of the side seal 62 such that the shimmed portion 70 may be under the bottom surface 73 of the angled leg 58 of the outer seal 57 and over the grooved portion 76 of each of the two transition pieces 25 (e.g., sandwiched between the outer seal 57 and the transition pieces 25). Likewise, the angled leg 58 of the outer seal 57 may fit into the grooved portion 76 of each transition piece 25, such that the outer seal 57 of the seal assembly 26 also contacts the grooved portion 76 of the transition pieces 25 to complete the seal. The engagement between the transition pieces 25 and the outer seal 57 is further described below.

Figure 5:
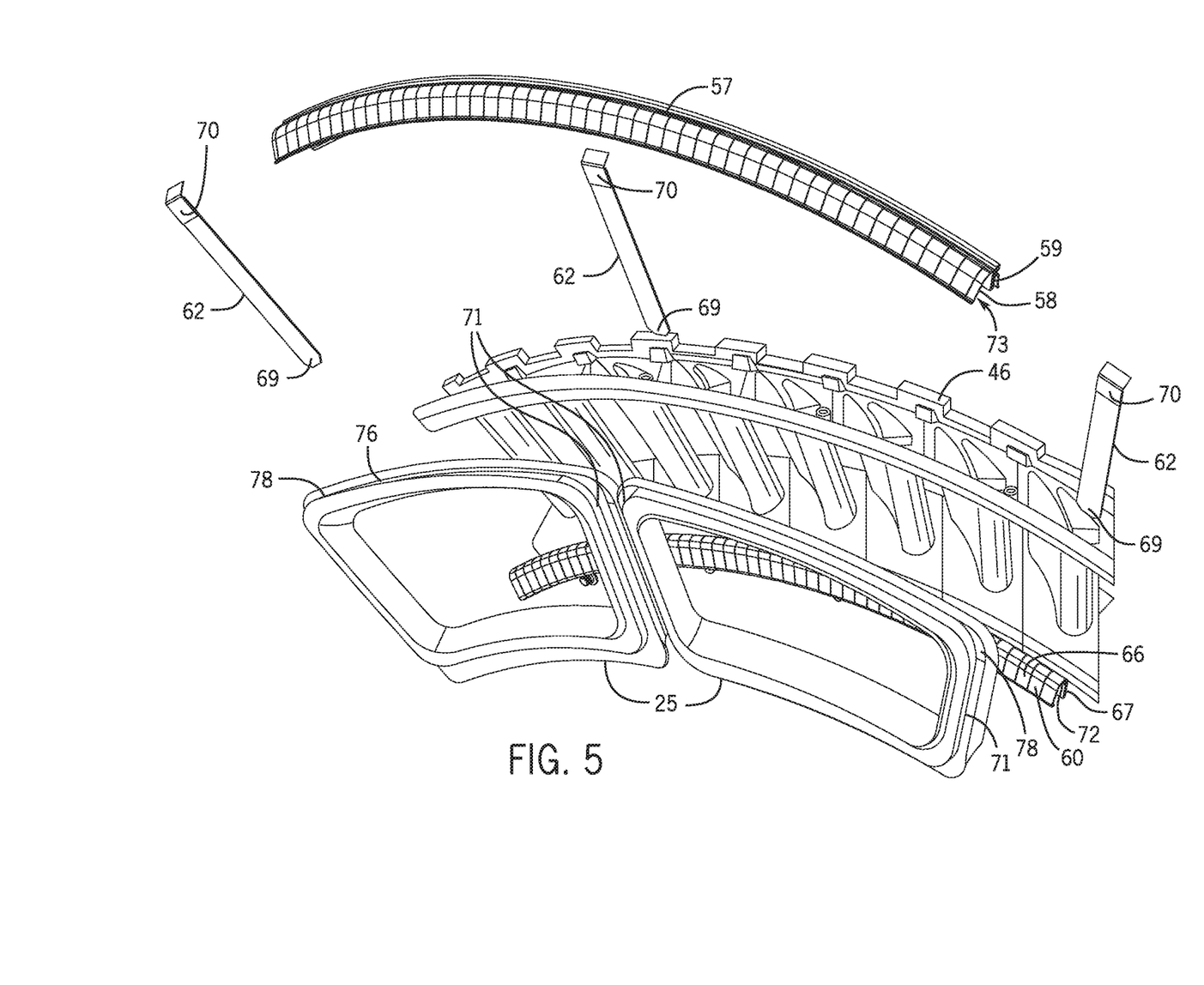
FIG. 5 is an exploded perspective view of an embodiment of the seal assembly, two transition pieces, and the nozzle of FIG. 3.

FIG. 5 shows an exploded perspective view of an embodiment of the seal assembly 26 to further illustrate the contact surfaces of the various seal assembly 26 members (e.g., side seals 62, outer seals 57, and inner seals 60) and components to be sealed (e.g., transition pieces 25 and nozzle 46 of the turbine 16). The side seals 62, as previously described, have the shimmed portions 70 that fit underneath the angled leg 58 of the outer seal 57, such that the shimmed portions 70 of the side seals 62 contact the bottom surface 73 of the angled leg 58 of the outer seal 57. The side seals 62 also fit into the slots 71 of their adjacent transition pieces 25 (e.g., the two transition pieces 25 contacted by the side seals 62). As a result, combustion products force or bias the side seals 62 against the slots 71 of the adjacent transition pieces 25 as the combustion products flow through the transition pieces 25 and into the nozzle 46 of the turbine 16. Further, the outer seal 57 fits into the grooved portion 76 of each adjacent transition piece 25. As such, the shimmed portion 70 of the side seal 62 in the present embodiment fits under the bottom surface 73 of the angled leg 58 of the outer seal 57, as previously discussed, and above an angled surface 78 of the grooved portion 76 of the adjacent transition pieces 25. Thus, the angled leg 58 of the outer seal 57 also fits into the grooved portion 76 of each transition piece 25 (e.g., two or more transition pieces 25) at an angle. Accordingly, a pressure difference from combustion products passing through the transition pieces 25 into the turbine 16 seals the gaps between the transition pieces 25 via the side seals 62 as previously discussed and may also push the nozzle 46 away from the transition pieces 25, causing the bottom surface 73 of the angled leg 58 of the outer seal 57 to contact and sealing engage with the angled surface 78 of the transition piece 25. Additionally, the inner seal 60 remains sealingly engaged with the transition pieces 25 and the nozzle 46 of the turbine 16 as previously described.

The angled surface 78 of the grooved portion 76 of each transition piece 25 may be oriented substantially parallel to the angle of the angled leg 58 of the outer seal 57 sealingly engaged with the grooved portion 76 of the transition pieces 25, or the angles may be different. Further, the angles may be selected such that the force generating the sealing engagement between the surfaces is enhanced, and the angled surface 78 of the transition piece 25 may be at an acute angle relative to a central axis 79 of the turbine 16 (See FIG. 6). The acute angle, for example, may be approximately a 45 degree angle relative to the central axis 79 of the turbine 16. The angle may also be in the range of approximately 0 to approximately 90 degrees, 20 to 70 degrees, 30 to 50 degrees, or any sub range therebetween.

Figure 6:
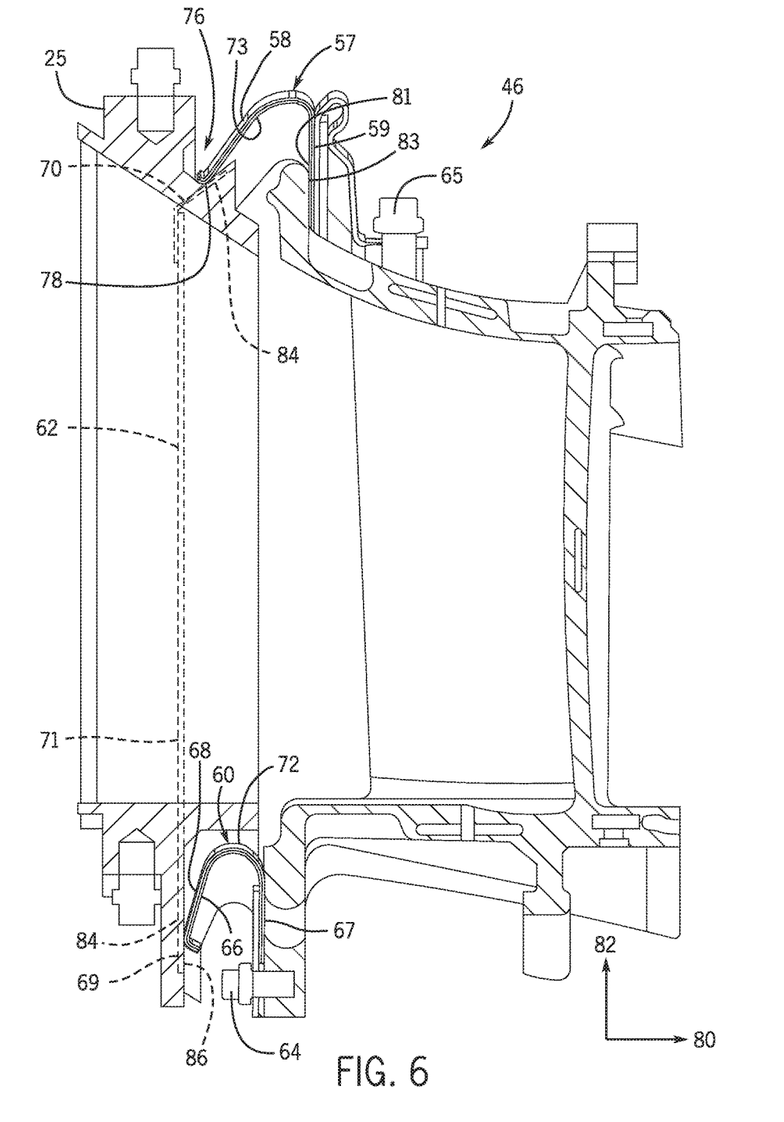
FIG. 6 is a cross-sectional view of an embodiment of a seal assembly between the transition piece and the nozzle.

Turning to FIG. 6, a cross sectional view of an embodiment of the seal assembly 26 is illustrated. As previously discussed, the grooved portion 76 of each transition piece 25 is configured to receive the angled leg 58 of the outer seal 57. The bottom surface 73 of the angled leg 58 contacts the angled surface 78 of the grooved portion 76 of each transition piece 25 to generate a sealing engagement. Thermal expansion and pressure differences that may result from combustion products passing through the transition pieces 25 to the turbine 16 may force the nozzle 46 away from the transition pieces 25. Because the outer seal 57 itself may be bolted to the nozzle 46 via the outer bolts 65, the outer seal 57 may be forced in a direction 80 away from the transition pieces 25 along with the nozzle 46. As the nozzle 46 and the outer seal 57 are forced away from the transition pieces 25, the force of the bottom surface 73 of the angled leg 58 of the outer seal 57 against the angled surface 78 of the grooved portion 76 of the transition pieces 25 may increase, causing the outer seal 57 to remain in a sealing engagement with the transition pieces 25. Additionally, the outer seal 57 remains in a sealing engagement with the nozzle 46 via contact of an upwards seal surface 81 of the vertical leg 59 of the outer seal 57, directed approximately in direction 82, with a flange surface 83 of the nozzle 46. When the force between the bottom surface 73 of the angled leg 58 of the outer seal 57 and the angled surface 78 of the grooved portion 76 of the transition pieces 25 increases as described above, the force exerted by the upwards seal surface 81 of the vertical leg 59 of the outer seal 57 on the flange surface 83 of the nozzle 46 may also increase. As such, movement of the nozzle 46 away from the transition pieces 25 (e.g., due to combustion products traveling in direction 80) may increase the forces (and, thus, enhance the seal) experienced between contact surfaces of the transition pieces 25 and the outer seal 57 and the outer seal 57 and the nozzle 46.

Additionally, the inner seal 60 may be mounted the nozzle 46 via the inner bolts 64, as shown in the illustrated embodiment. The inner seal 60, as previously discussed, may be disposed between the nozzle 46 and the transition pieces 25 such that the proximity of the nozzle 46 and the transition pieces 25 compresses the inner seal 60 inward (e.g., approximately in direction 80, or axially). The compression may generate a force that causes the outer surface 68 of the first leg 66 of the inner seal 60 to sealingly engage with a contact surface 86 of each transition piece 25, as previously described.

It should be noted that the side seals 62 in the illustrated embodiment may assist in sealing gaps between each transition piece 25, as previously discussed, as well as gaps near the top and bottom of each transition piece 25 adjacent to the outer seals 57 and inner seals 60 (e.g., the area between the two transition pieces 25 and adjacent to the outer seal 57 and the area between the two transition pieces 25 and adjacent to the inner seal 60). For example, the shimmed portion 70 of the side seal 62 may fit under the bottom surface 73 of the angled leg 58 of the outer seal 57 and above the angled surface 78 of the grooved portion 76 of each transition piece 25. The transition pieces 25 may each have a top indented recess 84 for the shimmed portion 70 of the side seal 62 to fit into (e.g., the top indented recess 84 of each transition piece 25 may be located above the slot 71 of the transition piece 25). As such, the bottom surface 73 of the angled leg 58 of the outer seal 57 may contact the shimmed portion 70 of the side seal 62 without being elevated above the angled surface 78 of the grooved portion 76 of each transition piece 25. Thus, the outer seal 57 may be sealingly engaged with both the side seal 62 and the grooved portion 76 of each transition piece 25. Additionally, the bottom portion 69 of the side seal 62 may fit into a bottom indented recess 84 in a similar manner as described above, such that the inner seal 60 may contact the bottom portion 69 of the side seal 62 without being elevated away from the contact surface 86 of the transition piece 25. Thus, the inner seal 60 may be sealingly engaged with both the side seal 62 and the contact surface 86 of each transition piece 25 as described above.

Figure 7:
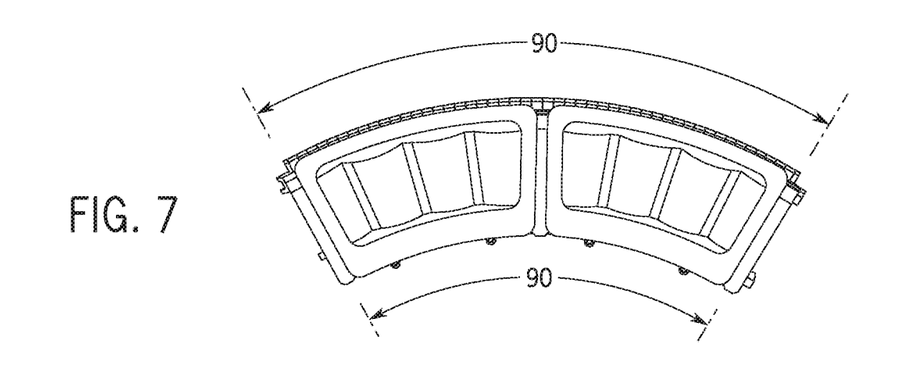
FIG. 7 is a front view of an embodiment of the seal assembly for transition pieces and a nozzle.
Figure 8:
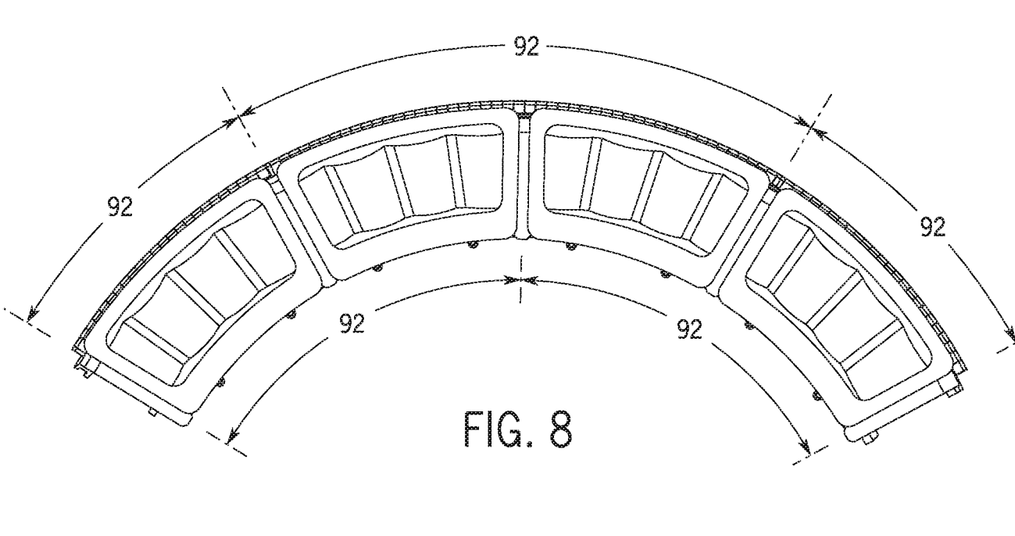
FIG. 8 is a front view of an embodiment of the seal assembly for transition pieces and a nozzle.
Figure 9:
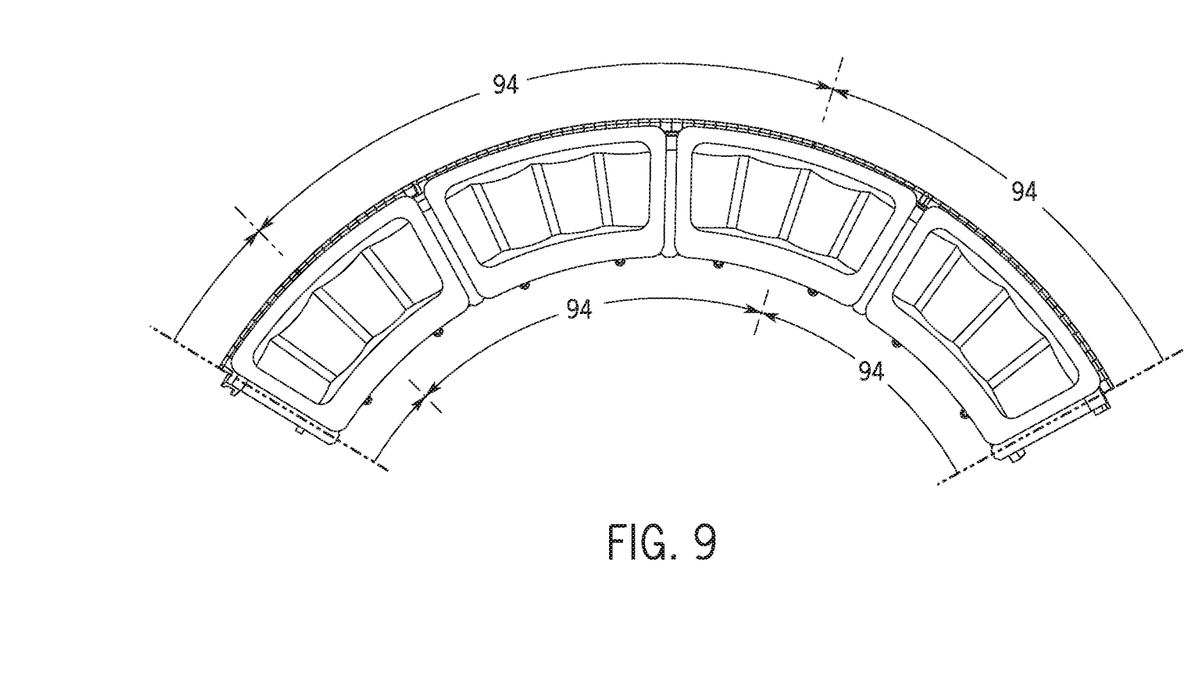
FIG. 9 is a front view of an embodiment of the seal assembly for the transition pieces and a nozzle.

FIGS. 7-9 illustrate axial views (i.e., planes at axial positions) of embodiments of the seal assembly 26. In FIG. 7, the outer seal 57 and the inner seal 60 each engage with the substantially the full length of two adjacent transition pieces 25, as indicated by arrows 90. Such an arrangement may be utilized to seal the entire annular arrangement of combustors 14 to the turbine 16 by using additional outer seals 57, inner seals 60, and side seals 62. However, it should be noted that FIG. 7 is merely a representation of one possible arrangement for sealing the transition pieces 25 of the combustors 14 to the turbine 16. It should be appreciated that the inner seal 60 and outer seal 57 may span more than two transition pieces 25, such that fewer inner seals 60 and outer seals 57 may be needed to cover the entire annular arrangement. For example, the inner seal 60 and outer seal 57 may span 2, 3, 4, 5, 6, 7, 8, 9, 10, or more transition pieces 25. As such, the number of gaps between seal assembly 26 members for the entire annual arrangement may be reduced.

Further, FIG. 8 illustrates an embodiment in which the inner seal 60 and outer seal 57 are staggered, as indicated by arrows 92. In other words, the inner seal 60 and the outer seal 57 may be offset such that the inner seals 57 and outer seals 60 do not necessarily begin and end on the same transition piece 25 or the same side of the same transition piece 25 as each other. Further still, the inner seal 60 and/or outer seal 57 may not begin and/or end on a side of the transition piece 25 at all, such as is illustrated in an embodiment in FIG. 9. For example, the inner seals 60 and/or outer seals 57 may begin and/or end in the middle, or some other portion, of a transition piece 25, as indicated by arrows 94. It should be noted that the embodiments illustrated in FIGS. 7-9 are meant merely as representations of possible implementations of the present disclosure. It should be appreciated that any combination of the above referenced variations or the utilization of a similar variation would not be considered as materially departing from the general disclosure by a person of ordinary skill in the art.

In summation, embodiments of the present disclosure are directed toward the seal assembly 26 for sealingly engaging with multiple gas turbine transition pieces 25 (e.g., transition pieces 25 downstream combustors 14) and the nozzle 46 of the turbine 16 (e.g., a stage 1 nozzle). The disclosed embodiments include the seal assembly 26 that may include the radially outer arcuate seal 57 and the radially inner arcuate seal 60 that each sealingly engage with multiple transition pieces 25 and the nozzle 46 of the turbine 16. In addition, the side seal 62 may be disposed circumferentially between two transition pieces 25. The radially inner and the radially outer seals 60, 57 may each span a number of transition pieces 25 to reduce the number of gaps between components of the seal assembly 26 and, thus, reduce leakage of combustion products as the combustion products flow from the combustors 14 to the turbine 16. The radially outer and radially inner seals 57, 60 of the seal assembly 26 may span two, three, four, or more transition pieces 25. As such, multiple seal assemblies 46 may be used to seal an entire arcuate arrangement of combustors 14 and respective transition pieces 25 (e.g., twelve combustors 14 and respective transition pieces 25 in a circumferential arrangement) to the nozzle 46 of the turbine 16.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A gas turbine engine, comprising:
   a gas turbine;
   a plurality of combustors circumferentially arranged about a central axis of the gas turbine engine, wherein each combustor of the plurality of combustors is in fluid communication with the gas turbine, and wherein each combustor comprises a radially outer arcuate length extending circumferentially about the central axis and a radially inner arcuate length opposite to the radially outer arcuate length and extending circumferentially about the central axis;
   a first seal disposed between the gas turbine and the plurality of combustors at a radially outer position, wherein the first seal is configured to sealingly engage with the gas turbine and at least two combustors of the plurality of combustors; and
   a second seal disposed between the gas turbine and the plurality of combustors at a radially inner position, wherein the second seal is configured to sealingly engage with the gas turbine and the at least two combustors of the plurality of combustors;
   wherein the first seal is mounted on the gas turbine and configured to sealingly engage with a first sealing interface surface of the at least two combustors of the plurality of combustors, the second seal is mounted on the gas turbine and configured to sealingly engage with a second sealing interface surface of the at least two combustors of the plurality of combustors, the first sealing interface surface is an upstream facing surface, and the second sealing interface surface is a downstream facing surface.

2. The gas turbine engine of claim 1, wherein the first seal and the second seal are each mounted to a first stage nozzle of the gas turbine.

3. The gas turbine engine of claim 1, comprising a side seal disposed circumferentially between two combustors of the at least two combustors and extending between the first seal and the second seal, wherein the side seal is configured to overlap with the first seal and the second seal along a radial direction relative to the central axis, and wherein the side seal is configured to sealingly engage with the first seal and the second seal.

4. The gas turbine engine of claim 3, wherein the side seal is configured to engage with a downstream facing surface of the first seal and with an upstream facing surface of the second seal.

5. The gas turbine engine of claim 1, wherein the first sealing interface surface is disposed at an acute angle within a range of 20 to 70 degrees relative to the central axis of the gas turbine.

6. The gas turbine engine of claim 1, wherein each combustor of the plurality of combustors comprises a corresponding transition piece, and wherein the first seal and the second seal being configured to engage with the at least two combustors of the plurality of combustors comprises the first seal and the second seal being configured to engage with at least two corresponding transition pieces of the plurality of combustors.

7. A system, comprising:
   a plurality of turbine combustors disposed in a circumferential arrangement, wherein each turbine combustor of the plurality of turbine combustors is configured to be in fluid communication with a gas turbine, and wherein each turbine combustor of the plurality of turbine combustors comprises a radially outer arcuate length extending along the circumferential arrangement;
   a seal configured to disposed between the gas turbine and the plurality of turbine combustors, wherein the seal is configured to sealingly engage with the gas turbine and at least two turbine combustors of the plurality of turbine combustors, wherein the seal comprises an arcuate length extending along the circumferential arrangement, and wherein the arcuate length is greater than the radially outer arcuate length; and
   a side seal separate from the plurality of combustors and disposed circumferentially between two turbine combustors of the at least two turbine combustors, wherein the side seal is configured to overlap with the seal in a radial direction relative to a central axis of the circumferential arrangement to sealingly engage with the seal;

wherein the seal comprises a radially outward arcuate seal and a radially inward arcuate seal, wherein the radially outward arcuate seal comprises the arcuate length and is configured to sealingly engage with the gas turbine and the at least two turbine combustors of the plurality of turbine combustors, and the radially inward arcuate seal is configured to sealingly engage with the gas turbine and the at least two turbine combustors of the plurality of turbine combustors; and wherein the radially outward arcuate seal is configured to be mounted to the gas turbine and configured to sealingly engage with a first sealing interface surface of the at least two turbine combustors of the plurality of turbine combustors, wherein the radially inward arcuate seal is configured to be mounted to the gas turbine and configured to sealingly engage with a second sealing interface surface of the at least two turbine combustors of the plurality of turbine combustors, wherein the first sealing interface surface is an upstream facing surface, and wherein the second sealing interface surface is a downstream facing surface.

8. The system of claim 7, wherein the seal is configured to be mounted to a first stage nozzle of the gas turbine.

9. A system, comprising:

a plurality of turbine combustors configured to be disposed in a circumferential arrangement about a central axis of a gas turbine engine, wherein each turbine combustor of the plurality of turbine combustors is configured to be in fluid communication with a turbine of the gas turbine engine;

a radially outward arcuate seal configured to be disposed between the turbine and the plurality of turbine combustors, wherein the radially outward arcuate seal is configured to sealingly engage with respective transition pieces of at least two turbine combustors of the plurality of turbine combustors, and wherein the radially outward arcuate seal is configured to be mounted to the turbine;

a radially inward arcuate seal is configured to be disposed between the turbine and the plurality of turbine combustors, wherein the radially inward arcuate seal is configured to sealingly engage with the respective transition pieces of the at least two turbine combustors of the plurality of turbine combustors, and wherein the radially inward arcuate seal is configured to be mounted to the turbine; and a side seal separate from the plurality of turbine combustors and the respective transition pieces thereof, and disposed circumferentially between the respective transition pieces of two turbine combustors of the at least two turbine combustors, wherein the side seal is configured to overlap with the radially outward arcuate seal and with the radially inward arcuate seal along a radial direction relative to the central axis of the gas turbine engine to sealingly engage with the radially outward arcuate seal and the radially inward arcuate seal;

wherein the side seal is configured to sealingly engage with a downstream facing surface of the radially outward arcuate seal, and wherein the side seal is configured to sealingly engage with an upstream facing surface of the radially inward arcuate seal, wherein the radially outward arcuate seal is configured to sealingly engage with a second upstream facing surface of the respective transition pieces, and wherein the radially inward arcuate seal is configured to sealing engage with a second downstream facing surface of the respective transition pieces.

10. The system of claim 9, comprising an inner bolt configured to mount the radially inward arcuate seal to the turbine.

\* \* \* \* \*